(12) United States Patent
Mano et al.

(10) Patent No.: US 11,298,893 B2
(45) Date of Patent: Apr. 12, 2022

(54) METHOD FOR MANUFACTURING STRUCTURE USING COMPOSITE MATERIAL

(71) Applicant: MITSUBISHI HEAVY INDUSTRIES, LTD., Tokyo (JP)

(72) Inventors: Shoya Mano, Tokyo (JP); Masahiko Shimizu, Tokyo (JP); Ryota Ozaki, Tokyo (JP); Akihito Suzuki, Tokyo (JP); Tsuyoshi Okawara, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/262,919

(22) PCT Filed: Aug. 29, 2019

(86) PCT No.: PCT/JP2019/033929
§ 371 (c)(1),
(2) Date: Jan. 25, 2021

(87) PCT Pub. No.: WO2020/071016
PCT Pub. Date: Apr. 9, 2020

(65) Prior Publication Data
US 2021/0237374 A1    Aug. 5, 2021

(30) Foreign Application Priority Data
Oct. 4, 2018  (JP) .............................. JP2018-189207

(51) Int. Cl.
B29C 70/44    (2006.01)
B29C 70/68    (2006.01)
(Continued)

(52) U.S. Cl.
CPC ............ *B29C 70/443* (2013.01); *B29C 53/04* (2013.01); *B29C 70/446* (2013.01); *B29C 70/68* (2013.01); *B29L 2031/003* (2013.01)

(58) Field of Classification Search
None
See application file for complete search history.

(56) References Cited

U.S. PATENT DOCUMENTS

| | | |
|---|---|---|
| 2012/0100343 A1 | 4/2012 | Borghini-Lilli et al. |
| 2014/0186578 A1 | 7/2014 | Outon Hernandez et al. |
| 2016/0176500 A1 | 6/2016 | Ross et al. |

FOREIGN PATENT DOCUMENTS

| | | |
|---|---|---|
| JP | 2012-532785 A | 12/2012 |
| JP | 2016-120647 A | 7/2016 |
| JP | 2016-534295 A | 11/2016 |

OTHER PUBLICATIONS

PCT/ISA/210, "International Search Report for International Application No. PCT/JP2019/033929," dated Nov. 19, 2019.

*Primary Examiner* — Barbara J Musser
(74) *Attorney, Agent, or Firm* — Manabu Kanesaka; Kenneth Berner; Benjamin Hauptman (57) ABSTRACT

Manufacturing structure using a composite material includes: a tapering step for forming a first tapered surface on a first stiffener in an uncured state; a bending step for bending the stiffener such that a second surface is on the inner side; an arranging step for arranging the first stiffener and a skin at prescribed positions; a vacuum suctioning step for vacuum suctioning the first stiffener and the skin; and a bonding step for curing the first stiffener to bond the first stiffener and the skin. In the tapering step, the angle formed between the first tapered surface and the second surface is an acute angle. In the vacuum suctioning step, the first tapered surface is brought into contact with the skin while maintaining contact between the first surface and the skin, and the (Continued)

first stiffener is deformed so that a second tapered surface is formed on the second surface.

3 Claims, 7 Drawing Sheets

(51) Int. Cl.
*B29C 53/04* (2006.01)
*B29L 31/00* (2006.01)

METHOD FOR MANUFACTURING STRUCTURE USING COMPOSITE MATERIAL

RELATED APPLICATIONS

The present application is National Phase of International Application No. PCT/JP2019/033929 filed Aug. 29, 2019, and claims priority from Japanese Application No. 2018-189207, filed Oct. 4, 2018, the disclosure of which is hereby incorporated by reference herein in its entirety.

TECHNICAL FIELD

The present invention relates to a method for manufacturing a structure using a composite material.

BACKGROUND ART

As a structure using a composite material used for a structural member of an aircraft, a structure composed of a skin and a stiffener is known. Since this structure can be manufactured by joining (co-bonding) the skin and the stiffener without using a fastener, weight reduction and cost reduction can be realized.

In this structure, there is a possibility that strength of a joint portion between an end portion of the stiffener and the skin may be reduced due to stress concentration on a predetermined portion, fiber waviness of the skin, or the like. In order to solve this problem, it is known that the end portion of the stiffener is processed so as to be a tapered surface (hereinafter, referred to as a "tapered surface") toward the skin (for example, PTL1).

CITATION LIST

Patent Literature

[PTL 1] United State Patent Application Publication No. 2016/0176500

SUMMARY OF INVENTION

Technical Problem

Meanwhile, as a structure including a stiffener and a skin, there is a structure is formed by joining a skin and a bent plate-shaped stiffener to each other. Even in this structure, an end portion of the stiffener may be tapered. In this case, when the bent stiffener is tapered, a shape of the bent stiffener may be defective due to poor workability. In order to avoid this problem, a flat plate-shaped stiffener may be tapered and then bent.

However, when the flat plate-shaped stiffener is tapered, the stiffener is bent after that. Accordingly, an angle (angle between the skin and the tapered surface when the stiffener and the skin is joined to each other) of a tapered surface is changed before and after the bending due to a difference in a peripheral length between an inner surface and an outer surface of the stiffener. Specifically, the angle of the tapered surface is usually changed so that the taper angle increases. Therefore, in order to make the taper angle after the bending a desired angle, when the tapering is performed, it is necessary to perform the tapering so that the taper angle is smaller than a desired taper angle.

Here, in order to suppress an occurrence of fiber waviness of the skin, for example, it is preferable to form a tapered surface so that the taper angle is 45° or less. That is, when tapering the flat plate-shaped stiffener, at least the taper angle needs to be smaller than 45°.

However, when the taper angle is small, the tapering is difficult, which may lead to a problem that processing accuracy decreases.

The present invention is made in consideration of the circumstances, and an object thereof is to provide a method for manufacturing a structure using a composite material capable of easily performing tapering and improving processing accuracy.

Solution to Problem

In order to solve the above problems, a method for manufacturing a structure using a composite material of the present invention adopts the following means.

According to an aspect of the present invention, there is provided a method for manufacturing a structure using a composite material having a skin and a stiffener which is a composite material in which fiber layers are laminated in a plate thickness direction, the method including: a tapering step of forming, with respect to the stiffener having a plate shape in an uncured state that has a first surface which is a flat plate surface and a second surface which is a surface opposite to the first surface, a first tapered surface forming an angle with the second surface; a bending step of bending the stiffener tapered in the tapering step so that the second surface is on an inner side; an arranging step of arranging the stiffener and the skin so that the first surface of the stiffener bent in the bending step and the skin comes into contact with each other; a vacuum suctioning step of covering the stiffener and the skin arranged in the arranging step with a flexible material and performing vacuum suctioning on an inside of the flexible material; and a joining step of curing the stiffener subjected to the vacuum suctioning step to join the stiffener and the skin to each other, in which in the tapering step, the tapering is performed so that the angle between the first tapered surface and the second surface after the bending is performed in the bending step is an acute angle, and in the vacuum suctioning step, the vacuum suctioning is performed to deform the stiffener so that the first tapered surface comes into contact with the skin while maintaining a contact state between the first surface and the skin, and to deform the stiffener so that a second tapered surface having an acute angle with respect to the skin is formed on the second surface.

In the above configuration, the stiffener is tapered before the bending is performed on the stiffener. Accordingly, the plate-shaped stiffener can be tapered, and thus, the tapering can be easily performed. Therefore, the stiffener can be accurately tapered.

The second surface is the surface which becomes the inner side in the bending step. Therefore, the angle (hereinafter, the angle between the first tapered surface and the second surface is referred to as a "taper angle") between the first tapered surface and the second surface is reduced by the bending. That is, the taper angle of the flat plate-shaped stiffener before the bending is larger than the taper angle of the stiffener after the bending. In the above configuration, the tapering is performed so that the angle between the first tapered surface and the second surface after the bending is performed in the bending step is an acute angle. As a result, the taper angle (that is, the taper angle when the first tapered surface is formed in the tapering step) of the flat plate-shaped stiffener before the bending is performed is larger than the acute angle, and thus, the angle is close to 90°. In this way, the taper angle when the tapering is performed can be set to an angle close to 90°, and thus, the tapering can be easily performed. As a result, processing accuracy of the tapering can be improved.

Further, in the method for manufacturing a structure using a composite material according to the aspect of the present invention, in the tapering step, the tapering may be performed so that the angle between the first tapered surface and the second surface is an angle set in consideration of a change in a plate thickness of the stiffener due to the curing in the joining step.

When the stiffener before the curing is cured, a plate thickness of the stiffener is changed. Accordingly, the angle between the second tapered surface and the skin also is changed according to the change in the plate thickness. In the above configuration, the taper angle to be tapered when the tapering is performed is set in consideration of the change in the plate thickness of the stiffener due to the curing in the joining step. Accordingly, the angle between the second tapered surface and the skin of the stiffener after the joining step can be set to a desired angle.

Further, in the method for manufacturing a structure using a composite material according to the aspect of the present invention, the skin in the arranging step and the vacuum suctioning step may be in an uncured state, and the skin may be cured in the joining step.

In the above configuration, since the stiffener tapered to form an acute angle with the skin is joined to the skin which is in the uncured state, it is possible to suppress occurrence of fiber waviness of the skin due to the end portion of the stiffener. Therefore, strength of the manufactured structure can be improved.

Advantageous Effects of Invention

According to the present invention, tapering can be facilitated and processing accuracy can be improved.

DESCRIPTION OF EMBODIMENTS

Hereinafter, an embodiment of a method for manufacturing a structure using a composite material according to the present invention will be described with reference to the drawings.

Structure

First, a structure manufactured by the method for manufacturing the structure using the composite material according to the present embodiment will be described with reference to FIG. 1.

Figure 1:
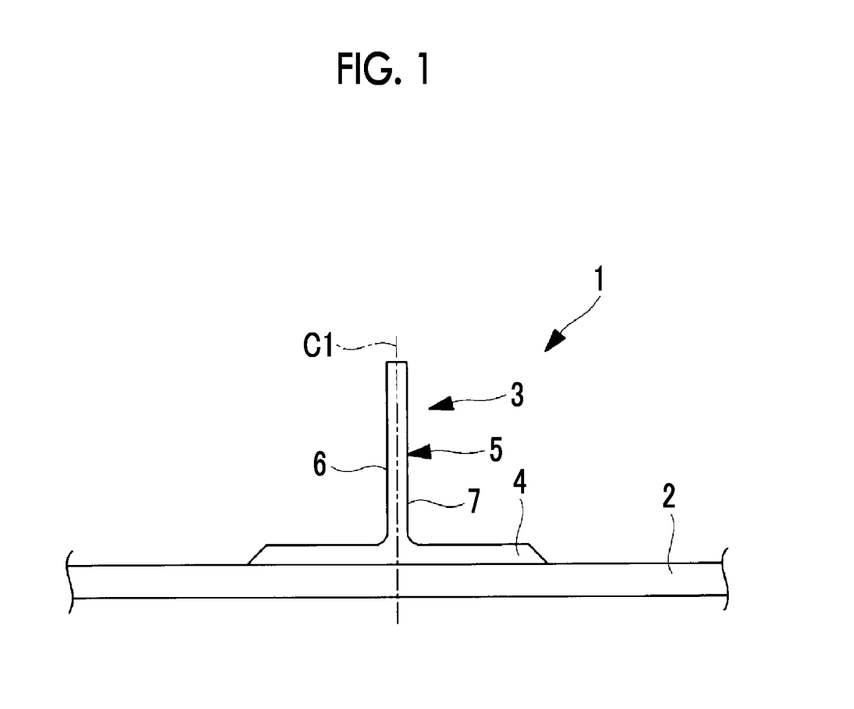
FIG. 1 is a schematic front view illustrating a structure using a composite material manufactured by a manufacturing method according to an embodiment of the present invention.

For example, a structure 1 manufactured by the method for manufacturing the structure using the composite material according to the present embodiment is the structure 1 used for a panel of an aircraft or the like, and as illustrated in FIG. 1, includes a skin 2 and a stiffener 3 which reinforces the skin 2. The skin 2 and the stiffener 3 are joined and integrated with each other.

The skin 2 is formed by curing a prepreg laminate obtained by laminating sheet-shaped prepreg base materials in a plate thickness direction and is formed in a plate shape. The stiffener 3 is formed by curing a prepreg laminate obtained by laminating sheet-shaped prepreg base materials (fiber layers) 3a (refer to FIGS. 4(a) to 4(c)) and is joined to a flat plate surface of the skin 2. The stiffener 3 integrally has a joint portion 4 to be joined to the flat plate surface of the skin 2 and a web portion 5 which extends to be substantially vertically curved from an upper surface of the joint portion 4. That is, the stiffener 3 has a substantially T-shaped cross-sectional shape in a longitudinal direction. Tapered surfaces (second tapered surface 6d to be described later) forming a predetermined angle with the skin 2 are formed on both ends of the joint portion 4.

Manufacturing Method

Next, a method for manufacturing the structure 1 will be described with reference to FIGS. 2(a) to 2(e). In the present embodiment, the stiffener 3 is configured by joining a first stiffener 6 and a second stiffener 7 which are divided at a center of the web portion 5 in a plate thickness direction. The first stiffener 6 and the second stiffener 7 are configured plane-symmetrically with respect to a center line C1 of the web portion 5 in the plate thickness direction. Therefore, the first stiffener 6 will be mainly described below, and detailed descriptions of the second stiffener 7 will be omitted.

Figure 2:
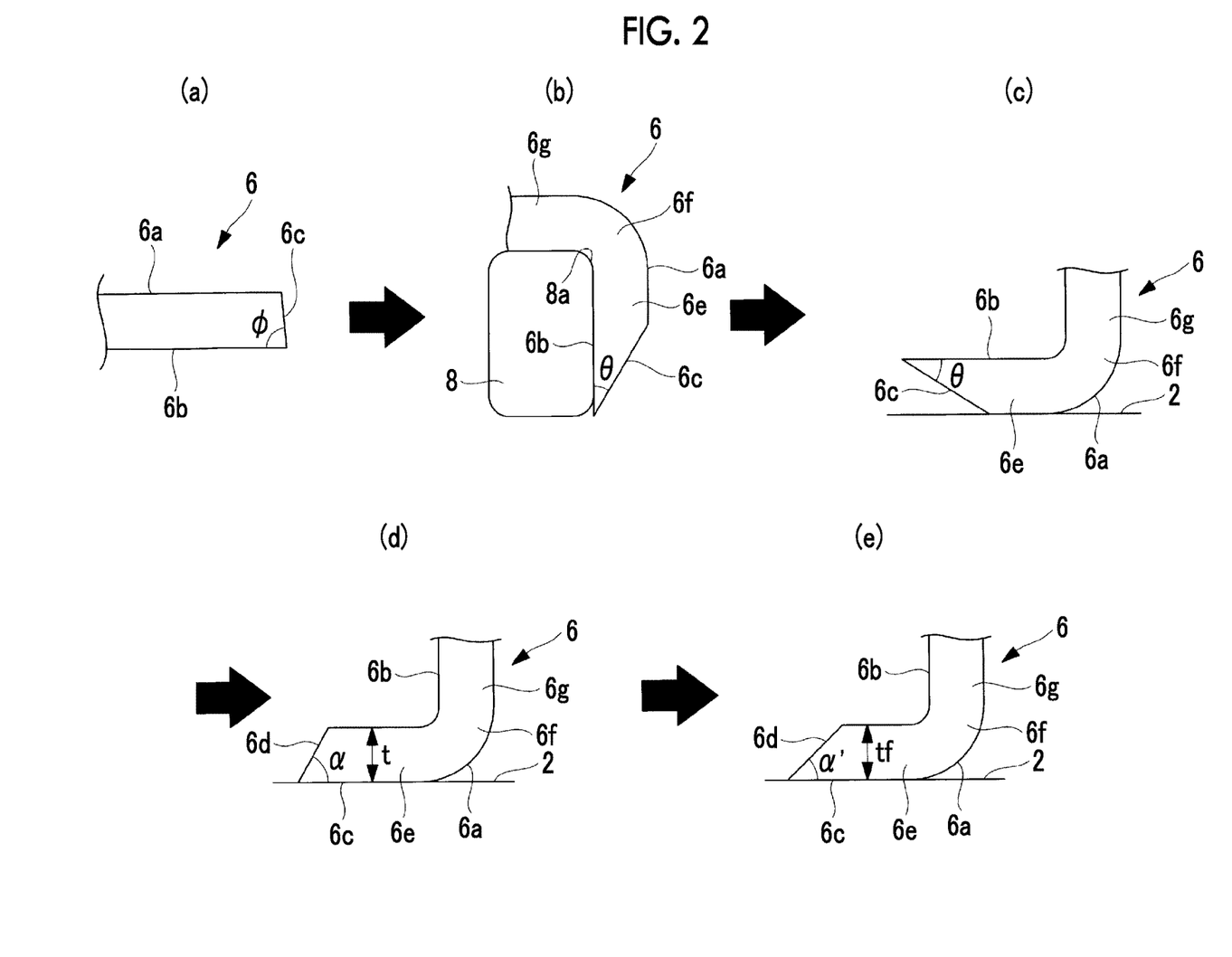
FIGS. 2(a) to 2(e) are are diagrams illustrating the manufacturing method according to the embodiment of the present invention.

First, as illustrated in FIG. 2(a), the first stiffener 6 which is in an uncured state and is a flat plate-shaped prepreg laminate is tapered (tapering step). Specifically, by cutting one end portion of a flat plate-shaped first stiffener 6 having a first surface 6a which is a flat plate surface and a second surface 6b which is a flat plate surface and is a surface opposite to the first surface 6a, a first tapered surface 6c having an inclination angle with respect to the first surface 6a and the second surface 6b is formed. In this case, the first tapered surface 6c is formed so that an angle (hereinafter, an angle between the second surface 6b and the first tapered surface 6c is referred to as a "first taper angle") between the second surface 6b which is on an inner side in a bending step described later and the first tapered surface 6c is an angle φ. In the present embodiment, the first tapered surface 6c is formed so that the first taper angle φ is an acute angle and an angle between the first surface 6a and the first tapered surface 6c is an obtuse angle.

Next, as illustrated in FIG. 2(b), by pressing the first stiffener 6 against a corner 8a of a jig 8 having the corner 8a curved at a predetermined angle (approximately 90° in this embodiment), the first stiffener 6 is bent (bending step). In this case, the bending is performed so that the second surface 6b of the first stiffener 6 is on the inner side. That is, the bending is performed so that the jig 8 and the second surface 6b are in contact with each other. When the bending is performed, the first taper angle is smaller than that of the tapering due to a difference in peripheral length between the first surface 6a and the second surface 6b. Specifically, the first taper angle is changed from the angle φ to an angle θ. In addition, φ>θ, and the angle θ is an acute angle. A tip-side portion 6e of a curved portion 6f of the bent first stiffener 6 constitutes the joint portion 4, and a base-side portion 6g of the curved portion 6f constitutes the web portion 5.

Next, as illustrated in FIG. 2(c), the first stiffener 6 and the skin 2 are arranged so that the first stiffener 6 and the skin 2 come into contact with each other (arranging step). The skin 2 is in an uncured state. In this case, the first stiffener 6 bent by the bending is arranged in a state of being rotated 90° clockwise. That is, the first stiffener 6 is arranged so that the tip-side portion 6e of the curved portion 6f in the first surface 6a of the first stiffener 6 and the flat plate surface of the skin 2 are in contact with each other. In this case, the first tapered surface 6c is not in contact with the skin 2. More specifically, a separation distance between the first tapered surface 6c and the flat plate surface of the skin 2 increases from a connection portion between the first tapered surface 6c and the first surface 6a toward a connection portion between the first tapered surface 6c and the second surface 6b.

Next, as illustrated in FIG. 2(d), the skin 2 and the first stiffener 6 are covered with a vacuum bag (flexible material) (not illustrated), and an inside of the vacuum bag is sucked so as to be in a vacuum state (vacuum suctioning step). By performing the suction so as to be in the vacuum state, the first stiffener 6 is deformed so that the first tapered surface 6c comes into contact with the skin 2 while a contact state between the tip-side portion 6e of the first surface 6a and the skin 2 is maintained. That is, the first surface 6a and the first tapered surface 6c are deformed so as to form a continuous flat surface. Moreover, at the same time, the first stiffener 6 is deformed so that a second tapered surface 6d forming a predetermined angle with respect to the skin 2 is formed on the tip-side portion 6e of the second surface 6b. In this case, the angle (hereinafter, the angle between the skin 2 and the second tapered surface 6d is referred to as a "second taper angle") between the skin 2 and the second tapered surface 6d is an angle α. The second taper angle is determined by the first taper angle. Moreover, in the present embodiment, the angle α is an acute angle.

Next, as illustrated in FIG. 2(e), the first stiffener 6 and the skin 2 are cured by heating. In this case, a plate thickness of the first stiffener 6 is changed so as to become thinner. Specifically, the plate thickness of the first stiffener 6 is changed from t to tf (t>tf). Further, the second taper angle decreases as the plate thickness of the first stiffener 6 is changed. Specifically, the second taper angle is changed from the angle α to an angle α' (α>α'). By curing the first stiffener 6 and the skin 2, the first stiffener 6 and the skin 2 are joined to each other (joining step).

Then, the second stiffener 7 is joined to the skin 2 by the same method as the above method and the first stiffener 6 and the second stiffener 7 are joined to each other. In this way, the structure 1 is manufactured. In the above description, the example in which the first stiffener 6 and the second stiffener 7 are separately subjected to the vacuum suctioning step and the joining step is described, but the present invention is not limited this. For example, after the arranging step of the first stiffener 6 is performed, the arranging step of the second stiffener 7 is performed, and then the vacuum suctioning step and the joining step may be collectively performed on the first stiffener 6 and the second stiffener 7.

Setting Method of Angle

Figure 3:
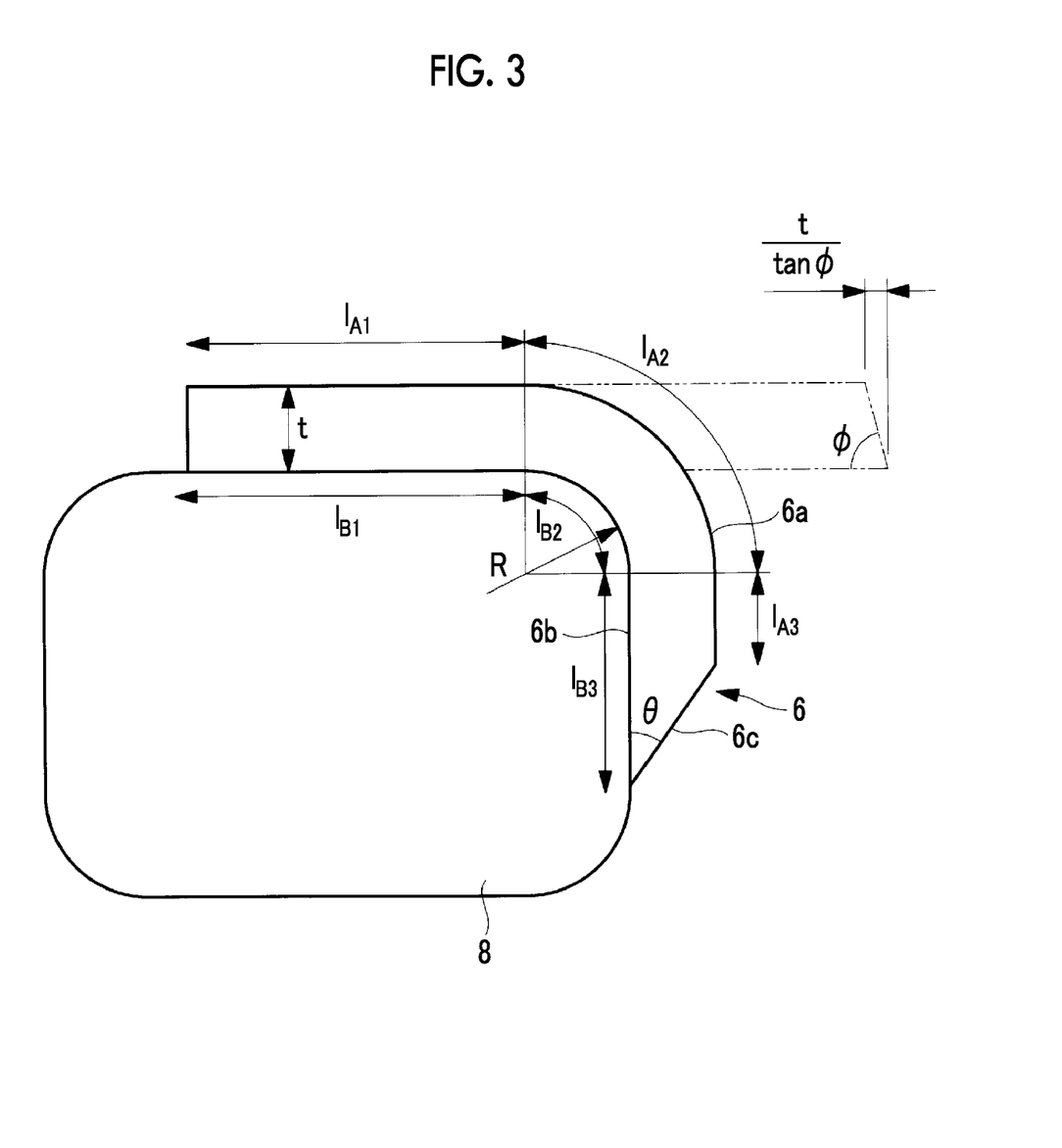
FIG. 3 is a diagram illustrating a method of calculating a taper angle in the manufacturing method according to the embodiment of the present invention.
Figure 4:
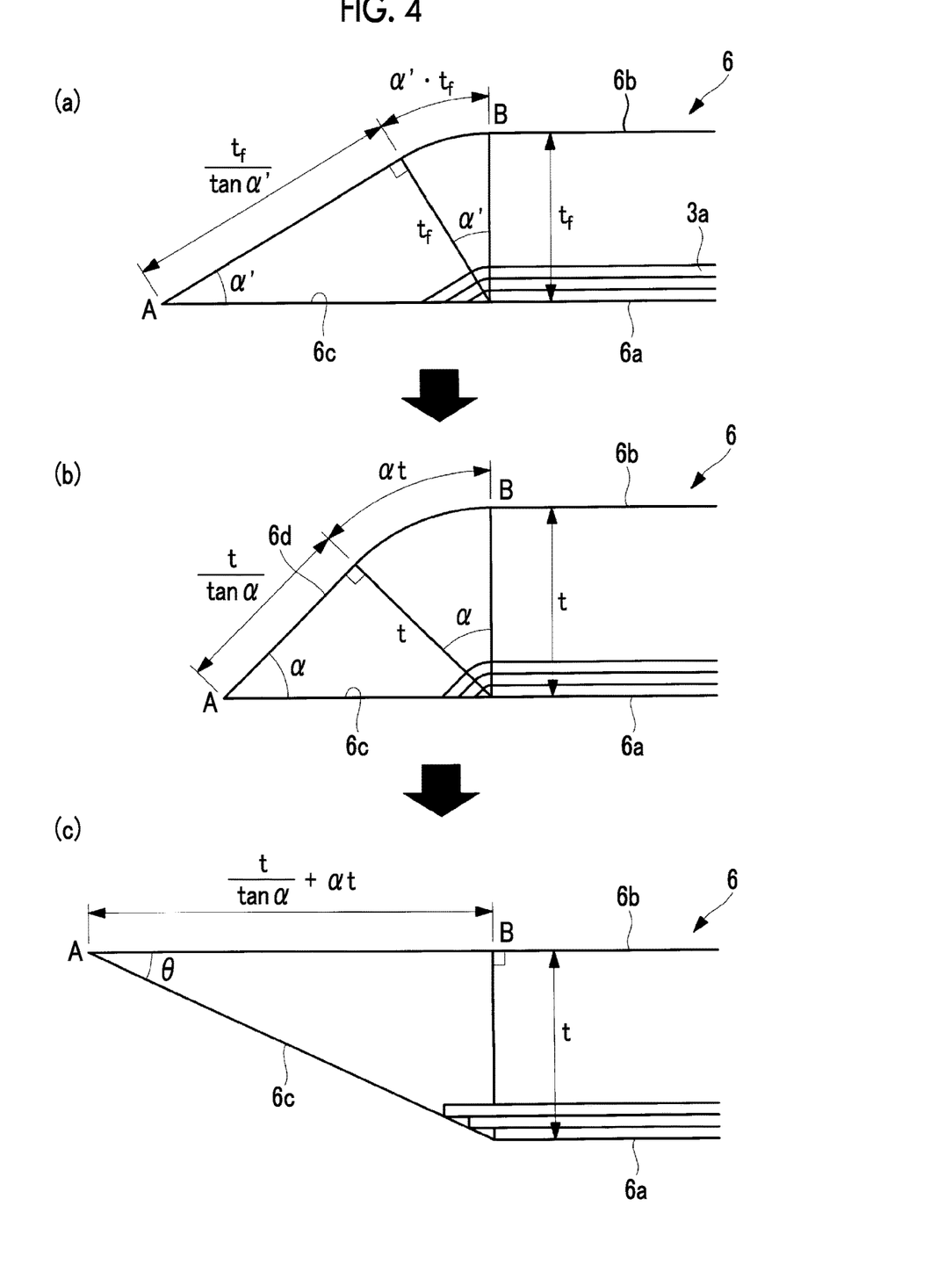
FIGS. 4(a) to 4(c) are diagrams illustrating the method of calculating the taper angle in the manufacturing method according to the embodiment of the present invention.

Next, a method of setting the first taper angle (in the present embodiment, the angle φ) when performing tapering in the tapering step will be described with reference to FIGS. 3 and 4. In the present embodiment, the first taper angle φ is set so that the second taper angle (in the present embodiment, the angle α') when the first stiffener 6 is cured is a desired angle. That is, the angle φ is set by back-calculating from the angle α' based on a change in angles in each processing step.

First, the change in the first taper angle in the bending step will be described with reference to FIG. 3. In FIG. 3, the first stiffener 6 after the bending is illustrated by a solid line, and the first stiffener 6 before the bending is illustrated by a two-dot chain line. Moreover, in the following description, a length of the first surface 6a of the first stiffener 6 is referred to $L_A$, and a length of the second surface 6b is referred to as $L_B$.

$L_A$ is represented by the following equation (1).

$$L_A = l_{A1} + l_{A2} + l_{A3} \quad (1)$$

Here, $l_{A1}$: a length of the base-side portion 6g of the curved portion 6f of the first surface 6a in the bent first stiffener 6.

$l_{A2}$: a length of the curved portion 6f of the first surface 6a in the bent first stiffener 6.

$l_{A3}$: a length of the tip-side portion 6e of the curved portion 6f of the first surface 6a in the bent first stiffener 6.

$L_B$ is represented by the following equation (2).

$$L_B = l_{B1} + l_{B2} + l_{B3} \quad (2)$$

Here, $l_{B1}$: a length of the base-side portion 6g of the curved portion 6f of the second surface 6b in the bent first stiffener 6.

$l_{B2}$: a length of the curved portion 6f of the second surface 6b in the bent first stiffener 6.

$l_{B3}$: a length of the tip-side portion 6e of the curved portion 6f of the second surface 6b in the bent first stiffener 6.

By performing the tapering, the length $L_A$ of the first surface 6a is shorter than the length $L_B$ of the second surface 6b. $L_B - L_A$ is calculated using a trigonometric function and is represented by the following equation (3). Here, t is the plate thickness of the first stiffener 6 before curing.

$$L_B - L_A = \frac{t}{\tan\varphi} \quad (3)$$

Since $l_{B2}$ is a 90° arc having a radius R, $l_{B2}$ is represented by the following equation (4).

$$l_{B2} = \frac{\pi R}{2} \quad (4)$$

Further, since $l_{A2}$ is a 90° arc having a radius R+t, $l_{A2}$ is represented by the following equation (5).

$$l_{A2} = \frac{\pi(R+t)}{2} \quad (5)$$

Apart from the equation (3), $L_B - L_A$ is represented by the following equation (6) from the equations (1) and (2).

$$L_B - L_A = (l_{B1} - l_{A1}) + (l_{B2} - l_{A2}) + (l_{B3} - l_{A3}) \qquad (6)$$

$l_{B1} = l_{A1}$. Further, by substituting equations (4) and (5) into equation (6), $L_B - L_A$ is represented by the following equation (7).

$$L_B - L_A = \left(\frac{\pi R}{2} - \frac{\pi(R+t)}{2}\right) + (l_{B3} - l_{A3}) \qquad (7)$$

Since a right side of the equation (3) and a right side of the equation (7) are equal to each other, the following equation (8) is represented.

$$\left(\frac{\pi R}{2} - \frac{\pi(R+t)}{2}\right) + (l_{B3} - l_{A3}) = \frac{t}{\tan\varphi} \qquad (8)$$

When the equation (8) is represented with $(l_{B3} - l_{A3})$ as a left side, it is represented by the following equation (9).

$$l_{B3} - l_{A3} = \frac{t}{\tan\varphi} + \frac{\pi t}{2} \qquad (9)$$

Here, tan θ is calculated by using a trigonometric function and is represented by the following equation (10).

$$\tan\theta = \frac{t}{l_{B3} - l_{A3}} \qquad (10)$$

By substituting the equation (9) into the equation (10), the tang θ is represented by the following equation (11).

$$\tan\theta = \frac{1}{\frac{1}{\tan\varphi} + \frac{\pi}{2}} \qquad (11)$$

When the equation (11) is represented with φ as a left side, it is represented by the following equation (12).

$$\varphi = \tan^{-1} = \frac{1}{\frac{1}{\tan\theta} - \frac{\pi}{2}} \qquad (12)$$

As described above, the first taper angle φ at the time of the tapering can be obtained by using the first taper angle θ after the bending processing and the equation (12).

Next, a method of obtaining the first taper angle θ after the bending will be described with reference to FIGS. 4(a) to (c). FIG. 4(a) corresponds to FIG. 2(e) and illustrates the first stiffener 6 after the curing. Further, FIG. 4(b) corresponds to FIG. 2(d), and illustrates the first stiffener 6 after the vacuum suction and before the curing. FIG. 4(c) corresponds to FIG. 2(c) and illustrates the first stiffener 6 before the vacuum suction. Black arrows in FIGS. 4(a) to (c) indicate a procedure for back calculation for obtaining the angle θ, and the order is a reverse of a processing procedure.

First, the change in the second taper angle due to the curing of the first stiffener 6 will be described with reference to FIGS. 4(a) and 4(b).

The angle α' illustrated in FIG. 4(a) is a desired second taper angle after the first stiffener 6 is cured. Further, in FIGS. 4(a) and 4(b), A indicates one end of the second tapered surface 6d. In detail, A indicates a connection portion between the second tapered surface 6d and the first surface 6a. Further, B indicates the other end of the second tapered surface 6d. In detail, B indicates a connection portion between the second tapered surface 6d and the second surface 6b.

A length (that is, a length between A and B) of the second tapered surface 6d of the first stiffener 6 after the curing is calculated by using a trigonometric function or the like as illustrated in FIG. 4(a), and is represented by the equation (13). Here, tf indicates a plate thickness of the first stiffener 6 after the curing.

$$\frac{t_f}{\tan\alpha'} + \alpha' t_f \qquad (13)$$

Further, a length (that is, a length between A and B) of the second tapered surface 6d of the first stiffener 6 after the vacuum suction and before the curing is calculated by using a trigonometric function or the like as illustrated in FIG. 4(b), and is represented by the equation (14). Here, t indicates a plate thickness of the first stiffener 6 before the curing.

$$\frac{t}{\tan\alpha} + \alpha t \qquad (14)$$

Since the length of the second tapered surface 6d of the first stiffener 6 before the curing and the length of the second tapered surface 6d of the first stiffener 6 after the curing are equal to each other, the following equation (15) is represented from the equations (13) and (14).

$$\frac{t_f}{\tan\alpha'} + \alpha' t_f = \frac{t}{\tan\alpha} + \alpha t \qquad (15)$$

A relationship between t and tf is represented by the following equation (16).

$$tf = t/\beta \qquad (16)$$

Here, β is a bulk factor

The bulk factor β is a value set based on a material (including air interposed between the prepreg base materials 3a) of the first stiffener 6, a method of laminating (manually laminating or automatically laminating using a device) the prepreg base material 3a, a joining method (a heating temperature when heating and a pressurizing pressure when pressurizing) in the joining step, or the like.

By substituting the equation (16) into the equation (15) and rearranging both sides, the following equation (17) is represented.

$$\frac{1}{\beta}\left(\frac{1}{\tan\alpha'} + \alpha'\right) = \frac{1}{\tan\alpha} + \alpha \qquad (17)$$

Next, the relationship between the first taper angle θ and the second taper angle α in the vacuum suctioning step of the first stiffener 6 will be described with reference to FIG. 4(*c*). In FIG. 4(*c*), A indicates a tip of the second surface 6*b*. Further, B indicates a position of the second surface 6*b* closest to a joint portion between the first tapered surface 6*c* and the first surface 6*a*. That is, a portion between A and B in FIG. 4(*c*) illustrates a portion which becomes the second tapered surface 6*d* after the vacuum suctioning step is performed. Therefore, a length between A and B in FIG. 4(*c*) is equal to the length between A and B in FIGS. 4(*a*) and 4(*b*). Specifically, the length between A and B can be represented by the above equation (14).

Tan θ before the vacuum suctioning step is calculated by using a trigonometric function and is represented by a "plate thickness t/the distance between A and B". Since the distance between A and B is represented by the above equation (14), tan θ is represented by the following equation (18).

$$\tan\theta = \frac{t}{\frac{t}{\tan\alpha} + \alpha t} = \frac{1}{\frac{1}{\tan\alpha} + \alpha} \quad (18)$$

From the above equation (18), the first taper angle θ is represented by the following equation (19).

$$\theta = \tan^{-1}\frac{1}{\frac{1}{\tan\alpha} + \alpha} \quad (19)$$

By substituting the above equation (17) into "(1/tanα) +α" of the equation (19), the following equation (20) is represented.

$$\theta = \tan^{-1}\frac{\beta}{\frac{1}{\tan\alpha'} + \alpha'} \quad (20)$$

As described above, the first taper angle θ after the bending can be obtained by using the desired second taper angle α' after the curing of the first stiffener 6 and the above equation (20).

That is, the first taper angle φ at the time of the tapering can be calculated from the desired second taper angle α' after the curing of the first stiffener 6 by using the above equation (20) and the above equation (12). In other words, by cutting the first stiffener 6 at the calculated first taper angle φ, the second taper angle α' of the first stiffener 6 after the curing can be set to a desired angle.

As a specific example, when the second taper angle α' after the curing of the first stiffener 6 is desired to be 45°, the second taper angle a before the curing is 61°. Further, the first taper angle θ after the bending and before the vacuum suction is 31.6°. Then, the first taper angle φ at the time of the tapering is 87°. In this example, the calculation is performed with the bulk factor β as 1.1.

According to the present embodiment, the following effects are exhibited.

Figure 5:
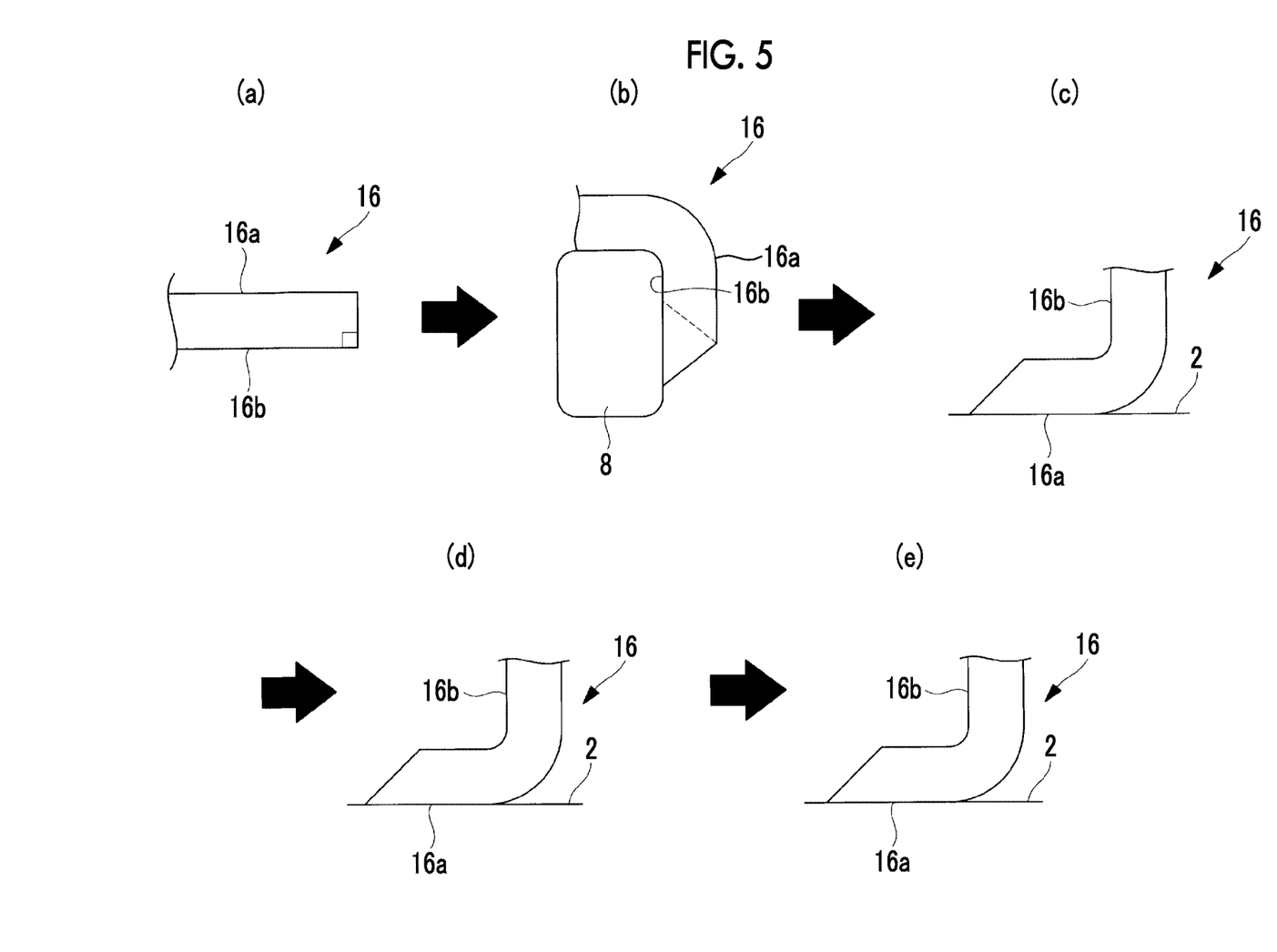
FIGS. 5(a) to 5(e) are diagrams illustrating a manufacturing method according to a first comparative example of the present invention.

As a method of tapering the first stiffener 6, a method illustrated in a first comparative example of FIGS. 5(*a*) to 5(*e*) can be considered. Specifically, in the first comparative example, first, the first stiffener 16 is bent so that the second surface 16*b* is on an inner side in a state where the first stiffener 16 is not tapered (refer to FIG. 5(*a*)). After the bending, cutting is performed along a line illustrated by a broken line in FIG. 5(*b*), and the first stiffener 16 is tapered. In the subsequent arranging step, only the first surface 16*a* is arranged so as to be in contact with the flat plate surface of the skin 2 (refer to FIG. 5(*c*)). Further, in the vacuum suctioning step, a shape of the first stiffener 16 does not change in particular (refer to FIG. 5(*d*)). Further, since the joining step (refer to FIG. 5(*e*)) is the same as that of the present embodiment, detailed descriptions thereof will be omitted.

However, in the method illustrated in the first comparative example, the bent first stiffener 16 is tapered, and thus, there is a possibility that the shape of the first stiffener 16 may be defective due to poor workability. Meanwhile, in the present embodiment, the first stiffener 6 is tapered before the bending is performed on the first stiffener 6. Accordingly, the plate-shaped first stiffener 6 can be tapered, and thus, the tapering can be easily performed. Therefore, the first stiffener 6 can be accurately tapered.

Figure 6:
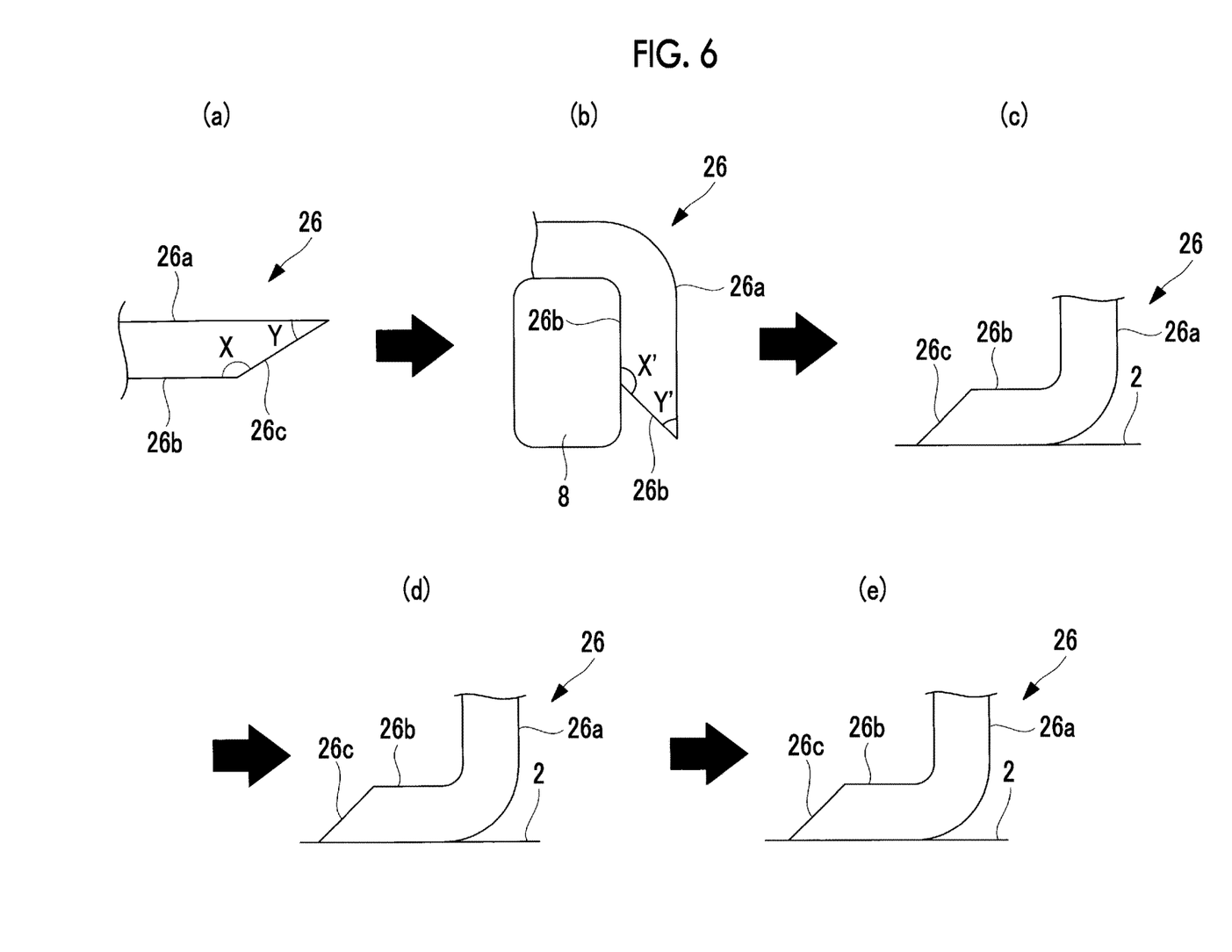
FIGS. 6(a) to 6(e) are diagrams illustrating a manufacturing method according to a second comparative example of the present invention.

Further, as the method of tapering the first stiffener 6, a method illustrated in a second comparative example of FIGS. 6(*a*) to 6(*e*) can be considered. Specifically, in the second comparative example, the first stiffener 26 before bending is performed is tapered. However, the tapering is performed so that an angle X between a second surface 26*b* which is on an inner side and a first tapered surface 26*c* in the bending step is an obtuse angle, and an angle Y between a first surface 26*a* and the first tapered surface 26*c* is an acute angle (refer to FIG. 6(*a*)). Further, also in the bent first stiffener 26, an angle X' between the second surface 26*b* and the first tapered surface 26*c* is an obtuse angle, and an angle Y' between the first surface 26*a* and the first tapered surface 26*c* is acute angle (refer to FIG. 6(*b*)). The subsequent arranging step (refer to FIG. 5 (*c*)), vacuum suctioning step (refer to FIG. 5 (*d*)), and joining step (refer to FIG. 5 (*e*)) are the same as those of the first comparative example, detail descriptions thereof are omitted.

When the first stiffener 26 is bent, an angle before the bending is different from an angle after the bending due to a difference in peripheral length between an inner surface and an outer surface of the first stiffener 26. Specifically, the angle X between the second surface 26*b* and the first tapered surface 26*c* is a large angle as compared with the angle X' after the bending is performed. Further, the angle Y between the first surface 26*a* and the first tapered surface 26*c* is smaller than the angle Y' after the bending is performed.

In the second comparative example, in the bent first stiffener 26, the angle X' is an obtuse angle, and the angle Y' is an acute angle. That is, the angle X in the first stiffener 26 before the bending is an obtuse angle larger than the angle X', and the angle Y is an acute angle smaller than the angle Y'. In other words, a tip of the first stiffener 26 before the bending is sharper than that of the bent first stiffener 26.

As described above, in the method of the second comparative example, in order to obtain a desired taper angle after the bending, the tip of the first stiffener 26 is made sharper (to have smaller taper angle) when the tapering is performed. Therefore, the tapering is difficult to be performed, which may lead to a problem that the processing accuracy decreases.

Further, in order to suppress an occurrence of fiber waviness of the skin 2, for example, it is preferable to form the second tapered surface 6*d* so that the angle between the skin 2 and the tapered surface is 45° or less. That is, when tapering the flat plate-shaped first stiffener 26, the taper angle needs to be at least smaller than 45°. Specifically, in the second comparative example, when it is desired to form the angle Y' after the bending at 45°, it is necessary to form the first tapered surface 26c so that the angle Y is set to 21.3° with respect to the first stiffener 26 before the bending. Forming the tapered surface so that the angle decreases may complicate a tapering work.

In the present embodiment, the tapering is performed so that the first taper angle θ after the bending is performed in the bending step is an acute angle. As a result, the first taper angle (that is, the first taper angle φ when forming the first tapered surface 6c) before the bending is performed is larger than the acute angle, and thus, the angle is close to 90°. In this way, the taper angle when the tapering is performed can be set to an angle close to 90°, and thus, the tapering can be easily performed. As a result, processing accuracy of the tapering can be improved.

Further, in the present embodiment, the first taper angle φ to be tapered when the tapering is performed is set in consideration of the change in the plate thickness of the first stiffener 6 due to curing in the joining step. As a result, the second taper angle α' in the first stiffener 6 after the joining step can be set to a desired angle.

Further, in the present embodiment, since the first stiffener 6 tapered to form an acute angle with the skin 2 is joined to the skin 2 which is in an uncured state, it is possible to suppress the occurrence of the fiber waviness of the skin 2 due to the end portion of the first stiffener 6. Therefore, strength of the manufactured structure 1 can be improved.

The present invention is not limited to the invention according to the above embodiment, and can be appropriately modified without departing from a gist thereof.

Figure 7:
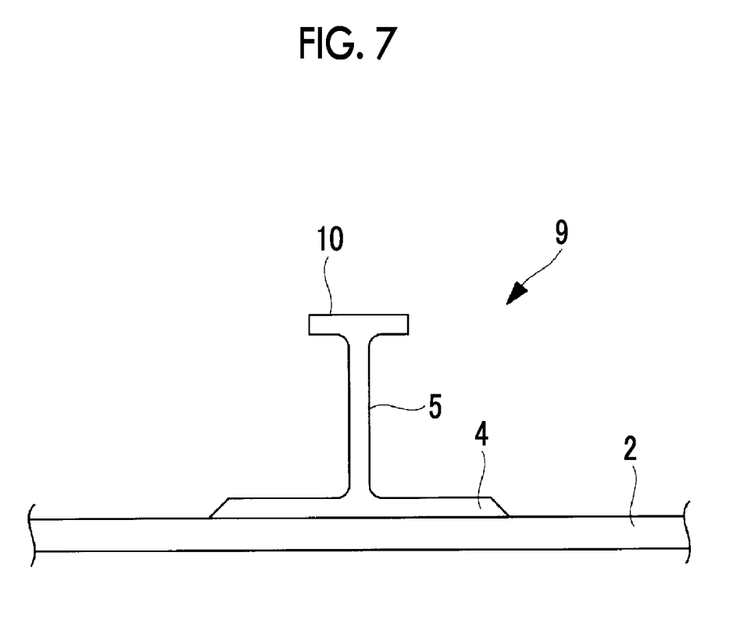
FIG. 7 is a diagram illustrating a modification example of the structure of FIG. 1.

For example, in the above embodiment, the example in which the stiffener 3 is constituted by the joint portion 4 and the web portion 5 is described, but the shape of the stiffener 3 is not limited to this. The stiffener 3 may be formed in any shape as long as it has the joint portion 4 to be joined to the skin 2 and the web portion 5 extending to be curved from the joint portion 4. In the stiffener 3, for example, as illustrated in FIG. 7, a structure 9 may have flange portion 10 which is provided on a tip of the web portion 5 and extends substantially parallel to the joint portion 4, and a cross-sectional shape of the structure 9 is formed in a substantially I shape.

Further, in the above embodiment, the example in which the manufactured structure 1 is used for an aircraft is described, but the structure 1 may be applied to other equipment, for example, to a ship.

Further, in the above embodiment, the example of joining the uncured skin 2 and the uncured stiffener 3 is described, but the present invention is not limited this. For example, the cured skin and the uncured stiffener 3 may be joined to each other. Further, for example, a metal skin and the uncured stiffener 3 may be joined to each other.

Further, in the above embodiment, the example in which the first taper angle φ at the time of the tapering is an acute angle is described, but the present invention is not limited to this. The first taper angle φ at the time of the tapering may be an obtuse angle or 90°. Depending on the setting of the second taper angle α' or the bulk factor β of the first stiffener 6 after the curing, the first taper angle φ may be an obtuse angle or 90°.

Further, in the above embodiment, the stiffener 3 and the skin 2 are heated in the joining step. However, the stiffener 3 is cured without heating, and the stiffener 3 and the skin 2 may be joined to each other. Further, in the joining step, the stiffener 3 and the skin 2 may be pressurized to join the stiffener 3 and the skin 2 to each other.

REFERENCE SIGNS LIST

1: structure
2: skin
3: stiffener
3a: prepreg base material
4: joint portion
5: web portion
6: first stiffener
6a: first surface
6b: second surface
6c: first tapered surface
6d: second tapered surface
6e: tip-side portion
6f: curved portion
6g: base-side portion
7: second stiffener
8: jig
8a: corner
16: first stiffener
16a: first surface
26: first stiffener
26a: first surface
26b: second surface
26c: first tapered surface
C1: center line

The invention claimed is:

1. A method for manufacturing a structure using a composite material having a skin and a stiffener which is a composite material in which fiber layers are laminated in a plate thickness direction, the method comprising:
   a tapering step of forming, with respect to the stiffener having a plate shape in an uncured state that has a first surface which is a flat plate surface and a second surface which is a surface opposite to the first surface, a first tapered surface forming an angle with the second surface;
   a bending step of bending the stiffener tapered in the tapering step so that the second surface is on an inner side;
   an arranging step of arranging the stiffener and the skin so that the first surface of the stiffener bent in the bending step and the skin comes into contact with each other;
   a vacuum suctioning step of covering the stiffener and the skin arranged in the arranging step with a flexible material and performing vacuum suctioning on an inside of the flexible material; and
   a joining step of curing the stiffener subjected to the vacuum suctioning step to join the stiffener and the skin to each other,
   wherein in the tapering step, the tapering is performed so that the angle between the first tapered surface and the second surface after the bending is performed in the bending step is an acute angle, and
   in the vacuum suctioning step, the vacuum suctioning is performed to deform the stiffener so that the first tapered surface comes into contact with the skin while maintaining a contact state between the first surface and the skin, and to deform the stiffener so that a second tapered surface having an acute angle with respect to the skin is formed on the second surface.

2. The method for manufacturing a structure using a composite material according to claim 1,
   wherein in the tapering step, the tapering is performed so that the angle between the first tapered surface and the second surface is an angle set in consideration of a change in a plate thickness of the stiffener due to the curing in the joining step.

3. The method for manufacturing a structure using a composite material according to claim 1,
wherein the skin in the arranging step and the vacuum suctioning step is in an uncured state, and
the skin is cured in the joining step.

* * * * *